(12) United States Patent
Morris et al.

(10) Patent No.: US 7,519,815 B2
(45) Date of Patent: Apr. 14, 2009

(54) CHALLENGE-BASED AUTHENTICATION WITHOUT REQUIRING KNOWLEDGE OF SECRET AUTHENTICATION DATA

(75) Inventors: Max G. Morris, Seattle, WA (US); Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 10/917,786

(22) Filed: Aug. 13, 2004

(65) Prior Publication Data
US 2005/0097325 A1    May 5, 2005

Related U.S. Application Data

(60) Provisional application No. 60/515,461, filed on Oct. 29, 2003.

(51) Int. Cl.
*H04L 9/00* (2006.01)
*G06F 15/16* (2006.01)
*H04K 1/00* (2006.01)

(52) U.S. Cl. ............... 713/168; 726/3; 380/278
(58) Field of Classification Search ........... 713/168; 726/3; 380/278
See application file for complete search history.

(56) References Cited

U.S. PATENT DOCUMENTS

| | | | |
|---|---|---|---|
| 5,930,804 A | 7/1999 | Yu | |
| 6,263,446 B1 * | 7/2001 | Kausik et al. | 726/5 |
| 6,606,711 B2 | 8/2003 | Andrews et al. | |
| 6,772,336 B1 | 8/2004 | Dixon, Jr. | 713/165 |
| 6,851,051 B1 * | 2/2005 | Bolle et al. | 713/168 |
| 6,947,902 B2 | 9/2005 | Shah | |
| 6,983,377 B1 * | 1/2006 | Beesley et al. | 726/12 |
| 7,191,151 B1 | 3/2007 | Nosek | |
| 7,209,889 B1 | 4/2007 | Whitfield | |
| 2002/0064149 A1 | 5/2002 | Elliott | |
| 2002/0114469 A1 * | 8/2002 | Faccin et al. | 380/270 |
| 2003/0110046 A1 | 6/2003 | Cofta | |
| 2003/0157925 A1 | 8/2003 | Sorber | |
| 2003/0163733 A1 * | 8/2003 | Barriga-Caceres et al. | 713/201 |

(Continued)

FOREIGN PATENT DOCUMENTS

WO    WO 01/84771    11/2001

(Continued)

OTHER PUBLICATIONS

Menezes, Alfred et al. Handbook of Applied Cryptography, CRC Press 1997, pp. 570-572.*

(Continued)

*Primary Examiner*—Emmanuel L Moise
*Assistant Examiner*—Michael Pyzocha
(74) *Attorney, Agent, or Firm*—Workman Nydegger (57) ABSTRACT

A challenge based authentication mechanism that does not require that the authenticating computing entities be aware of the secret data used for the initial authentication. An authenticator computing entity is to authenticate to the authenticatee computing entity. First, the authenticatee computing entity acquires a challenge from a supplemental authenticatee computing entity. The authenticatee computing entity provides the challenge to the authenticator computing entity, which has a supplemental authenticator computing entity solve the challenge. The authenticator computing entity sends the answer to the authenticatee computing entity, which uses the answer to authenticate the authenticator computing entity.

37 Claims, 4 Drawing Sheets

U.S. PATENT DOCUMENTS

| | | |
|---|---|---|
| 2004/0104807 A1 | 6/2004 | Ko |
| 2004/0179690 A1 | 9/2004 | Soliman .................... 380/277 |
| 2004/0205344 A1 | 10/2004 | Otway et al. ................ 713/169 |
| 2004/0254867 A1 | 12/2004 | Nethery |
| 2005/0165784 A1 | 7/2005 | Gomez |
| 2005/0182935 A1 | 8/2005 | Morris |
| 2005/0289082 A1 | 12/2005 | Morris |
| 2006/0069926 A1 | 3/2006 | Ginter |

FOREIGN PATENT DOCUMENTS

| | | |
|---|---|---|
| WO | WO 03/042830 | 5/2003 |
| WO | WO 2004/077208 | 9/2004 |

OTHER PUBLICATIONS

Office Action dated Jun. 20, 2008 cited in related U.S. Appl. No. 10/988,875 (Copy Attached).

Office Action dated Nov. 26, 2008 cited in U.S. Appl. No. 11/192,609 (Copy Attached).

* cited by examiner

CHALLENGE-BASED AUTHENTICATION WITHOUT REQUIRING KNOWLEDGE OF SECRET AUTHENTICATION DATA

CROSS-REFERENCE TO RELATED APPLICATIONS

The present application claims priority to U.S. provisional patent application Ser. No. 60/515,461 filed Oct. 29, 2003, which provisional application is incorporated herein by reference in its entirety.

BACKGROUND OF THE INVENTION

1. The Field of the Invention

The present invention relates generally to authentication. More specifically, the present invention relates to challenge-based authentication mechanisms that do not require knowledge of secret authentication data.

2. Background and Relevant Art

Computing technology has transformed the way we work and play. Computing systems and devices (hereinafter also referred to simply as "computing entities") now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions. In other computing entities, logic is implemented using hardware, or a combination or software and hardware.

Networking technologies enable computing entities to communicate even over vast distances, thereby expanding on computer functionality. For example, networking technologies enable such applications as e-mail, web browsing, file transfer, instant messaging, electronic whiteboarding, network collaboration, and the like. Accordingly, computer networks enable widespread communication and information access.

Unfortunately, computer networks also can potentially open up connected computing entities to security breaches. One type of security breach is for one computing system or user to make false claims about who they are to thereby access resources they should not have access to. In order to guard against this, an authenticatee computing entity (i.e., a computing entity that requires authentication) will often require an authenticator computing entity (i.e., a computing entity that must authenticate) to authenticate itself. The authenticatee computing entity may then make a more informed decision regarding how to interact with the authenticator computing entity.

One particularly useful form of authentication is often referred to as challenge/response authentication. In this form of authentication, when an authenticator computing entity (hereinafter also referred to as the "authenticator") is to authenticate to an authenticatee computing entity (hereinafter also referred to as the "authenticatee"), the authenticatee sends a challenge to the authenticator. The authenticatee then generates a response (also referred to herein as an "answer") to the challenge typically by applying a one-way hash algorithm to the challenge using secret data available to the authenticatee and authenticator. This secret data may be, for example, a password corresponding to the authenticator. The authenticator likewise also generates the same answer using the same hashing algorithm and using the same secret data. The authenticator then provides its answer to the authenticatee. The authenticatee then compares the answer that the authenticator generated with the answer that the authenticatee generated. If the answers match, then the authentication is successful. The challenge/response authentication is advantageous in that the secret data itself is not transmitted, and thus may not be intercepted.

However, this challenge/response authentication requires that the authenticator and authenticatee computing entities have access to the secret data used for authentication, and that the authenticator and authenticatee computing entities generate the answer. In some environments this may not be desirable. For example, many computing entities have limited processing power. The generation of an answer may degrade the performance of the computing entity by diverting processing power from other processes. Furthermore, the computing entities may not be themselves secure. Accordingly, an unauthorized entity might conceivably access the secret data and use that data to falsely authenticate.

Accordingly, what would be advantageous is a challenge/response authentication mechanism that does not require the authenticator and authenticatee computing entities to generate an answer or contain the secret data itself.

BRIEF SUMMARY OF THE INVENTION

The foregoing problems with the prior state of the art are overcome by the principles of the present invention, which relate to a challenge based authentication mechanism that does not require that the authenticating computing entities be aware of the secret data used for the initial authentication.

The environment includes four computing entities, an authenticatee computing entity, a supplemental authenticatee computing entity, an authenticator computing entity, and a supplemental authenticator computing entity. The authenticator computing entity is to authenticate to the authenticatee computing entity, but does not have direct access to the secret data needed to authenticate.

First, the authenticatee acquires a challenge from the supplemental authenticatee. This challenge may be solved by the supplemental authenticator, but not by the authenticatee and authenticator. The authenticatee may also pass a secret key to the supplemental authenticatee. The supplemental authenticatee encrypts the secret key using secret data known to the supplemental authenticatee and supplemental authenticator, but not to the authenticatee and authenticator themselves. This challenge and the secret data are the basis for the authentication, despite the secret data being unknown to the authenticatee and authenticator, and despite the challenge being unsolvable by the authenticatee or authenticator directly.

The authenticatee provides the challenge as well as potentially the encrypted key to the authenticator. The authenticator provides the challenge and any encrypted key to the supplemental authenticator. The supplemental authenticator solves the challenge to generate an answer, and also decrypts the encrypted key. The supplemental authenticator provides the answer and the decrypted key to the authenticator. At this stage, the decrypted key is known to the authenticatee and authenticator and may be used to secure future communications between the authenticatee and authenticator.

The authenticator then sends the answer to the authenticatee. The authenticatee then uses this answer to authenticate the authenticator either by validating the answer directly, or by causing the supplemental authenticatee to validate the answer.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide a challenge based authentication mechanism that does not require that the authenticating computing entities be aware of the secret data used for the initial authentication, and do not require the authenticating computing entities themselves generate an answer to a challenge.

Figure 1:
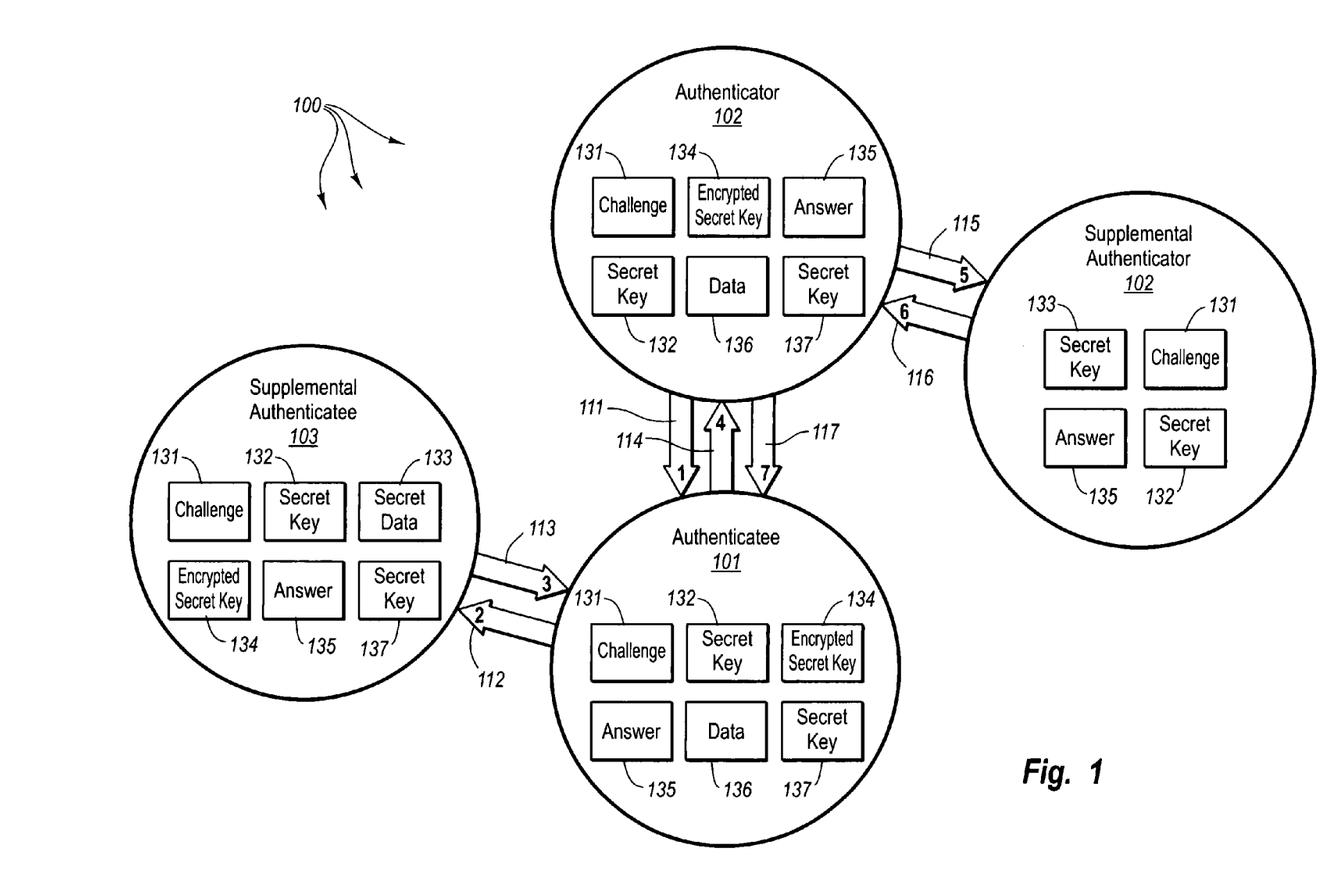
FIG. 1 is a diagram of a message exchange between an authenticatee, supplemental authenticatee, authenticator, and supplemental authenticator computing entities in accordance with the principles of the present invention.

FIG. 1 illustrates an environment 100 that includes four computing entities 101 through 104. Specifically, the four computing entities include what will be referred to as an authenticatee computing entity 101, an authenticator computing entity 102, a supplemental authenticatee computing entity 103, and a supplemental authenticator computing entity 104. In this description and in the claims, a "computing entity" is any device or system that may retain data in memory and/or storage, and is capable of electronic communication.

For example, each of the computing entities 101 through 104 may have access to its own internal data, and may communicate with one or more of the other computing entities. Such communication need not be across a network. For example, any two or more of the computing entities 101 through 104 may be within the same electronic device or computing system. As an example, the supplemental authenticator computing entity 104 may be a SIM card, while the authenticator computing entity 102 is a mobile telephone. The authenticatee computing entity 101 may be a front end Web server, while the supplemental authenticatee computing entity 103 may be a back end Web server. The principles of the present invention are not limited to this, however.

The authenticator computing entity 102 is to authenticate to the authenticatee computing entity 101. In the embodiment of FIG. 1, the authenticatee computing entity 101 and the supplemental authenticatee computing entity 103 are in a first common sphere of trust. The authenticator computing entity 102 and the supplemental authenticator computing entity 104 are also in a second common sphere of trust. The supplemental authenticatee computing entity 103 and the supplemental authenticator computing entity 104 are in a third common sphere of trust. A "sphere of trust" as used in this description and in the claims is defined as a collection of two or more computing entities in which each computing entity in the sphere of trust has received some assurance that the other computing entities are who they purport to be, and that information from the other computing entities is at least somewhat reliable.

In this description and in the claims, the authenticatee computing entity 101, the authenticator computing entity 102, the supplemental authenticatee computing entity 103, and the supplemental authenticator computing entity 104, may also be referred to as simply the "authenticatee 101", the "authenticator 102", the "supplemental authenticatee 103", and the "supplemental authenticator 104", respectively.

FIG. 1 also shows an example message flow that results in authentication consistent with the principles of the present invention. The sequential order of a message transfer is represented sequentially by the number in the head of the arrow that represents the message transfer. Using this message flow, an authentication method in accordance with the principles of the present invention will now be described. The method allows the authenticator 102 to authenticate to the authenticatee 101 using challenge based authentication and without requiring the authenticator 102 and authenticatee 101 computing entities be aware of secret data used for the authentication.

The authenticatee 101 determines that the authenticator 102 is to authenticate. This may be accomplished by, for example, the authenticatee 101 receiving a service request (see arrow 111) from the authenticator 102. However, the authenticatee 101 may make the determination that the authenticator 102 is to be authenticated in some other manner that does not rely on any service request from the authenticator 102. Accordingly, the service request represented by arrow 111 is not essential.

The authenticatee 101 then acquires a challenge 131 from the supplemental authenticatee 103. This may be accomplished in any manner. However, in FIG. 1, this is illustrated as being accomplished with two message transfers represented by arrows 112 and 113. Specifically, the authenticatee 101 provides a challenge request represented by arrow 112 to the supplemental authenticatee 103. The supplemental authenticatee 103 may then generate a challenge 131 in response to the challenge request, and then provides the challenge 131 to the authenticatee 101 in response to the request as represented by arrow 113. However, there are a number of alternative ways that the authenticatee 101 may acquire the challenge 131. The challenge 131 may have been provided by the supplemental authenticatee 103 without a challenge request such as, for example, when the authenticatee 101 registers with the supplemental authenticatee 103, or perhaps at predetermined times or time intervals.

In one embodiment called herein the "subsequent private communications embodiment", additional acts may be undertaken such that the authenticatee 101 and authenticator 102 may subsequently communicate without relying on the supplemental authenticatee 103 and supplemental authenticator 104. For example, in the subsequent private communications embodiment, the authenticatee 101 may generate secret key data 132 that is likely not known to the authenticator 102, the supplemental authenticatee 103, or the supplemental authenticator 104.

The authenticatee 101 provides the secret key data 132 to the supplemental authenticatee 103 thereby informing the supplemental authenticatee 103 of the secret key data 132. The secret key data 132 may, for example, have been provided in the same message as the challenge request represented by arrow 112.

The supplemental authenticatee 103 then may encrypt the secret key data 132 using secret data 133 known to the supplemental authenticatee 103 and the supplemental authenticator 104 computing entities, but not known to the authenticatee 101 and the authenticator 102. The supplemental authenticatee 103 then may provide the encrypted secret key data 134 to the authenticatee 101. This encrypted secret key data 134 may be provided at the same time and/or in the same message that the supplemental authenticatee 103 used to transfer the challenge 131 as represented by arrow 113.

The authenticatee 101 then provides the challenge 131 to the authenticator 102 as represented by arrow 114. At the same time and/or in the same message, the authenticatee 101 may also provide the encrypted secret key data 134 to the authenticator 102 as represented by arrow 114.

The authenticator 102 then acquires an answer to the challenge 131 from the supplemental authenticator computing entity. This may be accomplished in any manner. However, in FIG. 1, this is illustrated as being accomplished with two message transfers represented by arrows 115 and 116. Specifically, the authenticator 102 provides the challenge 131 to the supplemental authenticator 104 as represented by arrow 115. The supplemental authenticator 104 may then determine an answer 135 to the challenge 131, and then provides the answer 135 to the authenticator 102 as represented by arrow 116. The answer may be generated by, for example, performing a one-way hash algorithm on the challenge 131 using the secret data 133.

In the subsequent private communications embodiment, the authenticator 102 may also provide the encrypted secret key data 134 to the supplemental authenticator 104. This may be accomplished by including the encrypted secret key data 134 in the same message as was used to transmit the challenge to the supplemental authenticator 104 as represented by arrow 115.

The supplemental authenticator 104 may then decrypt the secret key data 134 using the secret data 133 known to the supplemental authenticatee 103 and the supplemental authenticator 104, thereby informing the supplemental authenticator 104 of the secret key data 132. The supplemental authenticator 104 then provides the secret key data 132 to the authenticator 102 thereby informing the authenticator 102 the secret key data 132. The supplemental authenticator 104 may provide the secret key data 132 back to the authenticator 102 potentially in the same message that was used to transfer the answer 135 to the authenticator 102. At this stage, both the authenticatee 101 and authenticator 102 have access to secret key data 132. This secret key data 132 may thus be used to authenticate each other in subsequent communications independent of the supplemental authenticatee 103 and supplemental authenticator 104.

The authenticator 102 provides the answer 135 to the authenticatee 101 as represented by the arrow 117. The authenticatee 101 may then use the answer 135 to authenticate the authenticator 102. There are a number of different ways that the authenticatee 101 may do this.

In one example, the authenticatee 101 may acquire an answer to the challenge from the supplemental authenticatee 103, potentially at the same time and in the same manner as the challenge was acquired from the supplemental authenticatee 103. The authenticatee 101 may then match the answer as acquired from the supplemental authenticatee 103 with the answer as provided by the authenticator 102. A match results in the authenticator 102 authenticating to the authenticatee 101.

Alternatively, the authenticatee 101 could delegate this comparison to the supplemental authenticatee 103 by providing the answer 135 as provided by the authenticator 102 to the supplemental authenticatee 103. The supplemental authenticatee 103 may then match the answer as provided by the authenticatee 101 with the answer that it internally generated. If a match is found, the supplemental authenticatee 103 may indicate to the authenticatee 101 that authentication is successful.

Accordingly, at this stage, the authenticator 102 has authenticated to the authenticatee 101, and the service request may be honored if appropriate. The authentication is challenge-based, and does not require the authenticatee 101 or authenticator 102 have access to the secret data 133 used to generate an answer to the challenge. Furthermore, in the subsequent private communications embodiment, the authenticator 102 and authenticatee 101 may authenticate in subsequent communications using the secret key data 132, rather than repeating the process described above.

Rather than simply securing subsequent communication based on the secret key data 132 alone, the subsequent communications may be secured using a digest of the secret key data 132 amongst one or more other items. The digest may then be used to secure subsequent communications between the authenticatee 101 and authenticator 102. The digest may also be based on the challenge 131 and/or the answer 135. Furthermore, the digest may include data 136 communicated between the authenticator 102 and authenticatee 101 that is not also communicated to the supplemental authenticatee 103 or supplemental authenticator 104. The authenticatee 101 and authenticator 102 may then communicate using the digest to secure communications. When the digest is based in part on the data 136 that is not known to the supplemental authenticatee 103 and the supplemental authenticator 104, the supplemental authenticatee 103 and supplemental authenticator 104 are prevented from easily eavesdropping or spoofing on subsequent communications between the authenticator 102 and authenticatee 101.

In one embodiment, the authenticator 102 also generates secret key data 137, which is provided to the supplemental authenticator 104. The supplemental authenticator 104 encrypts the secret key data 137, and passes the encrypted secret key data to the authenticator 102. The authenticator 102 then passes the encrypted secret key data to the authenticatee 101, which uses the supplemental authenticatee 103 to decrypt the secret key 137 using the secret data 133. The digest may then also be based upon this secret key 137.

Accordingly, a challenge-based authentication mechanism has been described in which the direct parties to the authentication (i.e., the authenticator and authenticatee computing entities) need not calculate an answer to a challenge, nor have knowledge of secret data used in the initial authentication. Furthermore, the authenticator and authenticatee computing entity may subsequently authenticate and communicate independent of the supplemental authenticator and supplemental authenticatee computing entities.

In the embodiment illustrated in FIG. 1, there are several communication channels, one between the authenticatee 101 and the supplemental authenticatee 103 (hereinafter also potentially referred to as "the authenticatee channel"), one between the authenticator 102 and the supplemental authenticator 104 (hereinafter also potentially referred to as the "authenticator channel"), and one between the authenticatee 101 and the authenticator 102 (hereinafter also potentially referred to as the "authentication channel"). If the two computing entities are within the same device or computing system, the corresponding channel may be a function call or local message mechanism. However, if the two computing entities are remotely located, the corresponding channel may use a networking protocol.

For example, if the two computing entities are located across different transport-level domains, a transport-independent network protocol may be used to communicate. One such transport-independent network protocol is known in the art as "Web Services" which uses Simple Object Access Protocol (SOAP) envelopes to convey information in a transport-independent manner. Web Services may also employ SOAP tunneling to transport across networks that do not directly support SOAP.

Figure 2:
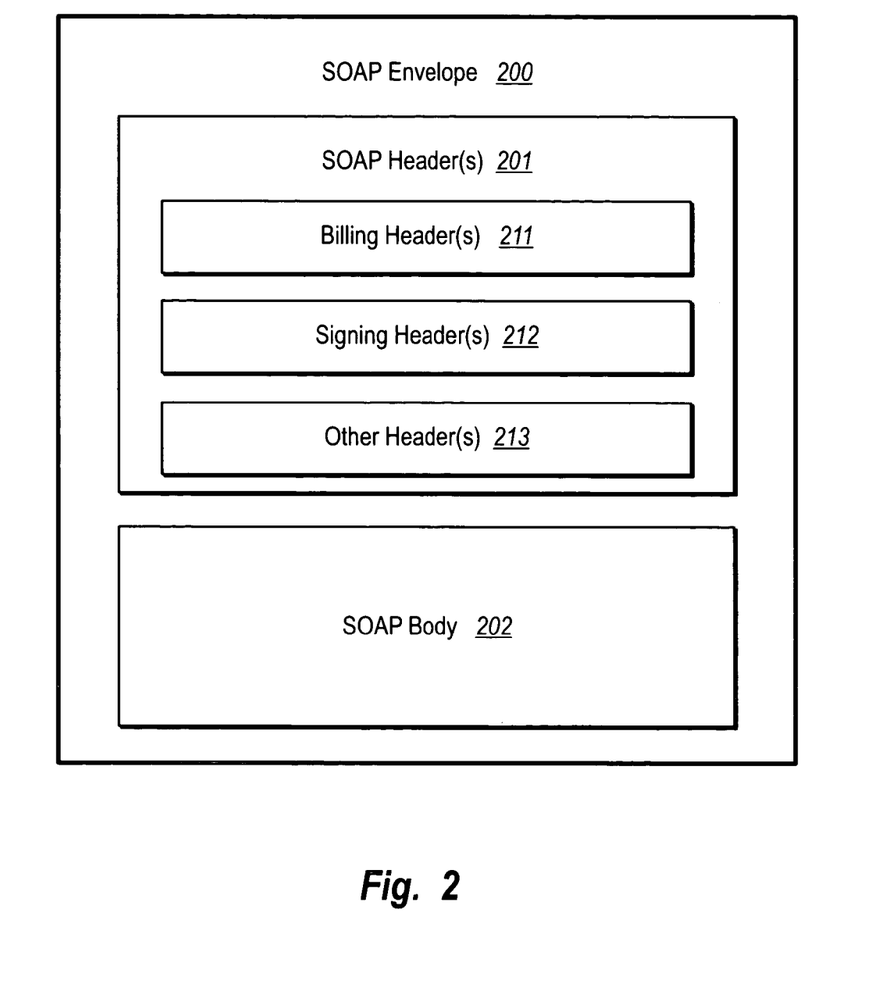
FIG. 2 schematically illustrates a data structure in the form of a Simple Object Access Protocol (SOAP) envelope that includes SOAP headers in the form of billing and signing headers.

According to one aspect of the invention, a modification to conventional Web Services may be employed to convey information important to authentication. For example, a SOAP header may include a signing SOAP header as described in the U.S. provisional application 60/515,461 incorporated by reference above. FIG. 2 schematically illustrates a structure of such a SOAP envelope suitable for performing billing and signing in the context of Web Services. The SOAP envelope 200 includes SOAP headers 201 and a SOAP body 202. The SOAP headers include billing header(s) 211, signing header(s) 212, amongst potentially other headers 213. The signing headers 212 may include the information for authentication. For example, the challenge 131, the secret key 132, the encrypted secret keys 134 and 137, the answer 135, and the data 136 as well as any other useful information may be included in the signing header(s) 212. However, the principles of the present invention are not limited to communication using Web Services. It may be that none of the authenticatee, authenticator, or authentication channels use Web Services in a particular embodiment.

Once authentication has been completed, the authenticatee 101 is now in a position to make a more intelligent decision regarding whether to authorize a service to be provided to the authenticator 102. Since the process has at this stage progressed beyond authentication to authorization, computing entities 101 through 104 will each in the subsequent description of the subsequent drawings be referred to simply as a "computing entity".

In order to authorize a requested service, the computing entity 101 may as a condition for such authorization require the payment or transfer of electronically transferable items from the computing entity 102. In this description and in the claims, an "electronically transferable item" is any item, whether physical or electronic, whose ownership may be transferred from one entity to another by sending an electronic message. The electronic message need not be purely electronic during the transfer, but may undertake other forms such as optical forms during the transfer. Such transferable items may include money. However, the transferable items may also include any other item that is electronically transferable. For example, the items may be frequent flier miles, movie or opera ticket credits, train tickets, class registration authority, and so forth. Likewise, in order to perform the requested service, the computing entity 101 may transfer electronically transferable items to the computing entity 102.

Figure 3:
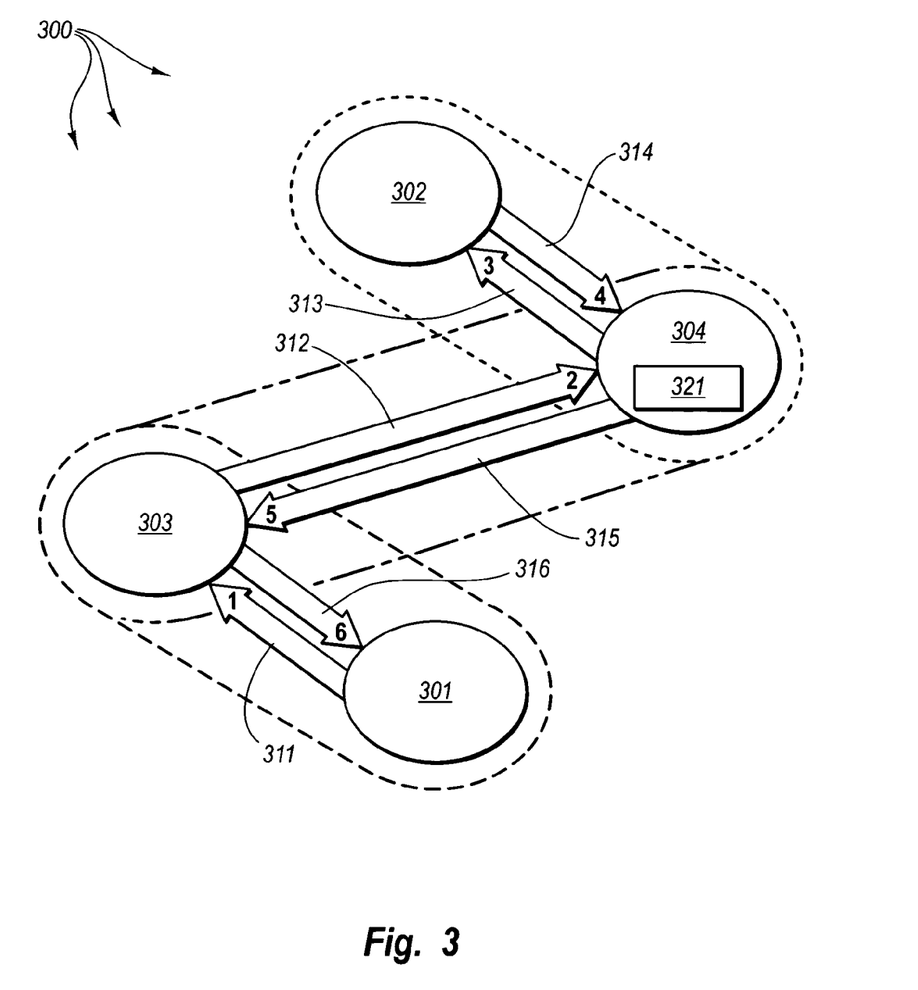
FIG. 3 illustrates a message exchange in which electronically transferable items are transferred between two computing entities in accordance with a first embodiment of the present invention.

FIG. 3 illustrates the environment of FIG. 1 in which there are four computing entities 301 through 304. The computing entities 301 through 304 may be the same as described above for computing entities 101 through 104, although this is not required. Computing entities 301 and 303 are in one sphere of trust represented by the area within the dashed lines. Computing entities 302 and 304 are in another sphere of trust represented by the area within the dotted lines. Computing entities 303 and 304 are within yet another sphere of trust as represented the area within the intermittent dotted/dashed lines.

FIG. 3 also shows a message flow showing a way of transferring electronically transferable items between computing entities 301 and 302. Computing entity 304 has authorization information 321 relevant to whether or not computing entity 302 may transfer particular items to computing entity 301. For example, if the computing entity 302 were a SIM card, the items to be transferred may be, for example, money.

The message flow shows how items could be authorized to be transferred and then actually transferred from computing entity 302 to computing entity 301. In order to authorize transfer, the computing entity 301 may inquire (see arrow 311) of computing entity 303 as to whether or not computing entity 302 has authorization to transfer the items. If the computing entity 303 does not already know, the computing entity 303 will make the inquiry (see arrow 312) to computing entity 304 as to whether or not computing entity 302 is authorized to make the transfer. If the computing entity 304 does not already know, the computing entity 304 will make inquiry (see arrow 313) to computing entity 302 about whether to make the transfer. The computing entity 302 may respond (see arrow 314) in the affirmative. Upon receiving this message, or if the computing entity 304 had been pre-authorized to make the charge due to prior communication with computing entity 302, then the computing entity 304 responds (see arrow 315) in the affirmative. Upon receiving this message, or if the computing entity 303 had been pre-authorized to make the charge due to a prior communication with computing entity 304, then the computing entity 303 responds (see arrow 316) in the affirmative. The affirmative confirmations represented by arrows 314 through 316 may also include electronic transfer of the items itself, or an agreement to enforce transfer at a later time.

Figure 4:
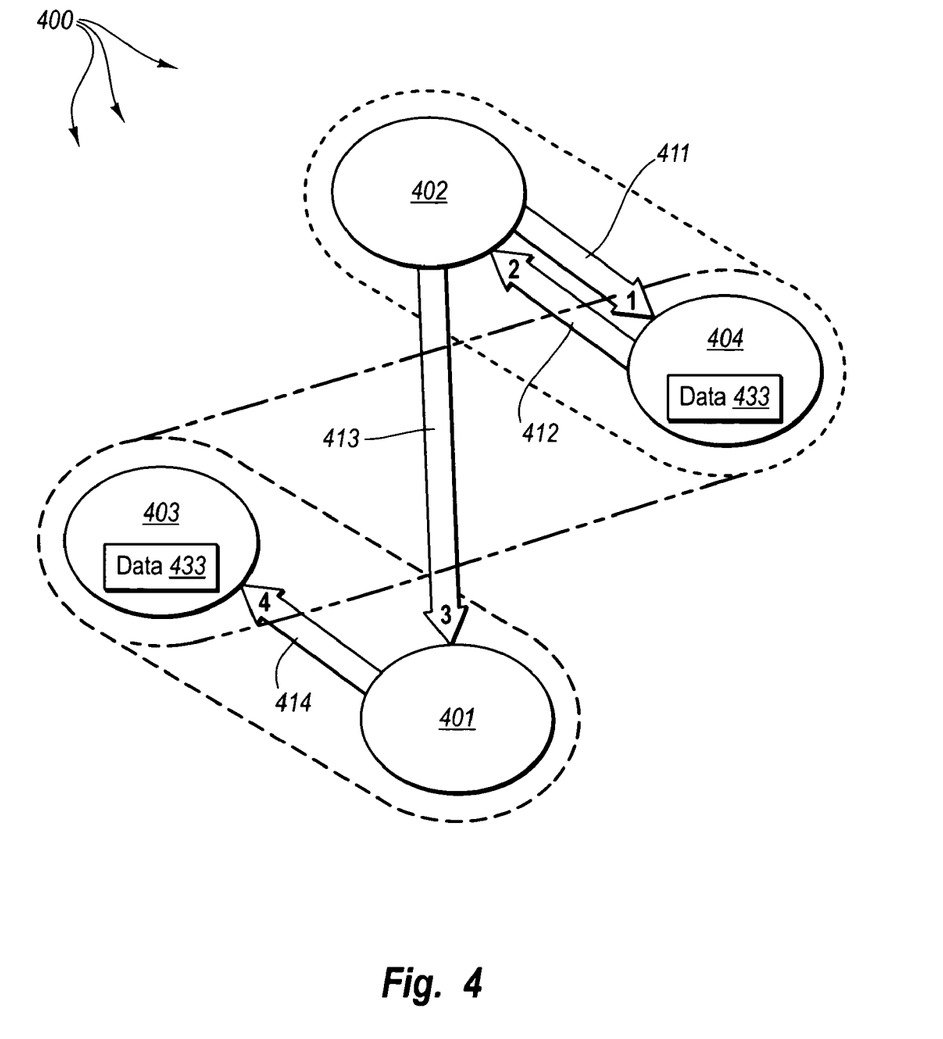
FIG. 4 illustrates a message exchange in which electronically transferable items are transferred between two computing entities in accordance with a second embodiment of the present invention.

An alternative embodiment of transfer is illustrated in FIG. 4. In this embodiment, computing entity 402 requests (see arrow 411) that the transfer of items be made. Computing entity 404 responds (see arrow 412) with an approval to transfer the items (see arrow 412) and then debits an account by the items to be transferred. The approval to transfer may be encrypted using secret data 433 known to the computing entities 403 and 404, but not to the computing entities 401 and 402. Computing entity 402 then provides the encrypted approval (see arrow 413) to computing entity 401, which then provides the encrypted approval (see arrow 414) to computing entity 403. The computing entity decrypts the approval using secret data 433 and then credits the account of computing entity 401 or the user of computing entity 401 in the amount of the items being transferred. Upon a subsequent reconciliation or in real-time, computing entity 403 may acquire a credit for the items transferred from computing entity 404.

Thus, transfer of the electronically transferable items is made from the computing entity 402 (or its user) to the computing entity 401 (or its user). Transfer in the other direction from computing entity 401 to computing entity 402 may be accomplished in the same manner as described above only in the symmetrically opposite direction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an environment that includes an authenticatee computing entity, a supplemental authenticatee computing entity, an authenticator computing entity, and a supplemental authenticator computing entity, a method for the authenticator computing entity to authenticate to the authenticatee computing entity using challenge based authentication and without requiring the authenticatee and authenticator computing entities be aware of secret data used for the authentication, the method comprising the following:
   an act of the authenticatee computing entity generating secret key data that is not known to the supplemental authenticatee, authenticator or supplemental authenticator computing entities;
   an act of the authenticatee computing entity providing the secret key data to the supplemental authenticatee computing entity thereby informing the supplemental authenticatee computing entity of the secret key data;
   an act of the supplemental authenticatee computing entity encrypting the secret key data using secret data known to the supplemental authenticatee and supplemental authenticator computing entities, but not known to the authenticatee and authenticator computing entities, the secret data for use in protecting a proper answer to a challenge based on the secret key data;
   an act of the authenticatee computing entity acquiring the challenge along with the encrypted secret key data from the supplemental authenticatee computing entity;
   an act of the authenticatee computing entity providing the challenge along with the encrypted secret key data to the authenticator computing entity;
   an act of the authenticator computing entity providing the challenge along with encrypted secret key data to the supplemental authenticator computing entity;
   an act of the supplemental authenticator computing entity decrypting the encrypted secret key data using the secret data known to the supplemental authenticatee and supplemental authenticator computing entities thereby informing the supplemental authenticator computing entity of the secret key data;
   an act of the supplemental authenticator computing entity using the secret key data to create a purported answer to the challenge;
   an act of the authenticator computing entity acquiring the purported answer to the challenge from the supplemental authenticator computing entity;
   an act of the authenticator computing entity providing the purported answer to the authenticatee computing entity; and
   an act of the authenticatee computing entity comparing the purported answer to the proper answer to authenticate the authenticator computing entity at the authenticatee computing entity without having to generate an answer to the challenge at the authenticatee computing entity.

2. A method in accordance with claim 1, wherein the act of the authenticatee computing entity acquiring a challenge from the supplemental authenticatee computing entity comprises the following:
   an act of the authenticatee computing entity providing a challenge request to the supplemental authenticatee computing entity;
   an act of the supplemental authenticatee computing entity generating a challenge in response to the challenge request; and
   an act of the supplemental authenticatee computing entity providing the challenge to the authenticatee computing entity in response to the request.

3. A method in accordance with claim 2, wherein the act of the authenticator computing entity acquiring purported answer to the challenge from the supplemental authenticator computing entity comprises the following:
   an act of the authenticator computing entity providing the challenge to the supplemental authenticator computing entity; and
   an act of the supplemental authenticator computing entity determining purported answer to the challenge; and
   an act of the supplemental authenticator computing entity providing the purported answer to the authenticator computing entity.

4. A method in accordance with claim 1, further comprising:
   an act of the supplemental authenticatee computing entity providing the challenge along with encrypted secret key data to the authenticatee computing entity.

5. A method in accordance with claim 4, further comprising the following:
   an act of the authenticatee and authenticator computing entities communicating using messages that are at least partially secured using the secret key data.

6. A method in accordance with claim 4, wherein the act of the authenticatee computing entity providing the challenge to the authenticator computing entity and the act of the authenticatee computing entity providing the encrypted secret key data to the authenticator computing entity are performed by the authenticatee computing entity providing a single message that includes both the challenge and the encrypted secret key data to the authenticator computing entity.

7. A method in accordance with claim 4, further comprising the following:
   an act of the authenticatee computing entity generating a digest of the secret key data combined with one or more other data items;
   an act of the authenticator computing entity also generating the digest of the secret key data combined with the one or more other data items; and
   an act of the authenticatee and authenticator computing entities communicating using messages that are at least partially secured using the digest.

8. A method in accordance with claim 7, wherein the one or more other data items includes the challenge.

9. A method in accordance with claim 8, wherein the one or more other data items includes the purported answer.

10. A method in accordance with claim 9, wherein the secret key data is first secret key data, wherein the one or more other data items includes second secret key data known to the authenticatee and authenticator computing entities, but not known to the supplemental authenticatee and supplemental authenticator computing entities.

11. A method in accordance with claim 7, wherein the one or more other data items includes the purported answer.

12. A method in accordance with claim 11, wherein the secret key data is first secret key data, wherein the one or more other data items includes second secret key data known to the authenticatee and authenticator computing entities, but not known to the supplemental authenticatee and supplemental authenticator computing entities.

13. A method in accordance with claim 7, wherein the secret key data is first secret key data, wherein the one or more other data items includes second secret key data known to the authenticatee and authenticator computing entities, but not known to the supplemental authenticatee and supplemental authenticator computing entities.

14. A method in accordance with claim 4, wherein the secret key data is first secret key data, the method further comprising:
   an act of the authenticator computing entity generating second secret key data;
   an act of the authenticator computing entity providing the second secret key data to the supplemental authenticator computing entity;
   an act of the supplemental authenticator computing entity encrypting the second secret key data using the secret data known to the supplemental authenticatee and supplemental authenticator computing entities;
   an act of the supplemental authenticator computing entity providing the encrypted second secret key data to the authenticator computing entity;
   an act of the authenticator computing entity providing the encrypted second secret key data to the authenticatee computing entity;
   an act of the authenticatee computing entity providing the encrypted second secret key data to the supplemental authenticatee computing entity;
   an act of the supplemental authenticatee computing entity decrypting the encrypted second secret key data using the secret data known to the supplemental authenticatee and supplemental authenticator computing entities; and
   an act of the supplemental authenticatee computing entity providing the second secret key data to the authenticatee computing entity.

15. A method in accordance with claim 14, further comprising the following: an act of the authenticatee computing entity generating a digest of the first and second secret key data combined with one or more other data items;
   an act of the authenticator computing entity also generating the digest of the first and second secret key data combined with the one or more other data items; and
   an act of the authenticatee and authenticator computing entities communicating using messages that are at least partially secured using the digest.

16. A method in accordance with claim 15, wherein the one or more other data items includes the challenge.

17. A method in accordance with claim 16, wherein the one or more other data items includes the purported answer.

18. A method in accordance with claim 17, wherein the one or more other data items includes third secret key data known to the authenticatee and authenticator computing entities, but not known to the supplemental authenticatee and supplemental authenticator computing entities.

19. A method in accordance with claim 15, wherein the one or more other data items includes the purported answer.

20. A method in accordance with claim 19, wherein the one or more other data items includes third secret key data known to the authenticatee and authenticator computing entities, but not known to the supplemental authenticatee and supplemental authenticator computing entities.

21. A method in accordance with claim 15, wherein the one or more other data items includes third secret key data known to the authenticatee and authenticator computing entities, but not known to the supplemental authenticatee and supplemental authenticator computing entities.

22. In an environment that includes an authenticatee computing entity, a supplemental authenticatee computing entity, an authenticator computing entity, and a supplemental authenticator computing entity, a method for the authenticatee computing entity to authenticate the authenticator computing entity using challenge based authentication and without requiring the authenticatee and authenticator computing entities be aware of secret data used for the authentication, the method comprising the following:
   an act of authenticatee computing entity generating secret key data that is not known to the supplemental authenticatee, authenticator or supplemental authenticator computing entities;
   an act of providing the secret key data to the supplemental authenticatee computing entity thereby informing the supplemental authenticatee computing entity of the secret key data;
   an act of the supplemental authenticatee computing entity encrypting the secret key data using secret data to create encrypted secret key data, the secret data known to the supplemental authenticatee and supplemental authenticator computing entities, but not known to the authenticatee and authenticator computing entities, the secret data for use in determining an answer to a challenge;
   an act of the authenticatee computing entity acquiring the challenge along with the encrypted secret key data from the supplemental authenticatee computing entity;
   an act of the authenticatee computing entity providing the challenge along with the encrypted secret key data to the authenticator computing entity, wherein the authenticator computing entity acquires purported answer to the challenge from the supplemental authenticator computing entity by providing the encrypted secret key data to the supplemental authenticator computing entity for decryption by the supplemental authenticator computing entity, and receiving back the secret key data;
   an act of the authenticatee computing entity acquiring the purported answer from the authenticator computing entity; and
   an act of the using the purported answer to authenticate the authenticator computing entity.

23. A method in accordance with claim 22, wherein the act of acquiring a challenge from the supplemental authenticatee computing entity comprises the following:
   an act of providing a challenge request to the supplemental authenticatee computing entity; and
   an act of acquiring proper answer to the challenge request from the supplemental authenticatee computing entity.

24. A method in accordance with claim 22,
   wherein the act of using the purported answer to authenticate the authenticator computing entity comprises the following:
      an act of matching the purported answer as acquired from the supplemental authenticatee computing entity with appropriate answer as provided by the authenticator computing entity.

25. A method in accordance with claim 22, wherein the act of using the purported answer to authenticate the authenticator computing entity comprises the following:
   an act of providing the purported answer to the supplemental authenticatee computing entity; and an act of receiving from the supplemental authenticatee computing entity an indication that the purported answer is a proper answer for the challenge acquired from the supplemental authenticatee computing entity.

26. A method in accordance with claim 22, further comprising:

an act of the supplemental authenticator computing entity decrypting the secret key data using the secret data known to the supplemental authenticatee and supplemental authenticator computing entities.

27. A method in accordance with claim 26, further comprising the following:

an act of communicating with the authenticator computing entity using messages that are at least partially secured using the secret key data.

28. A method in accordance with claim 26, wherein the act of providing the challenge to the authenticator computing entity and the act of the providing the encrypted secret key data to the authenticator computing entity are performed by providing a single message that includes both the challenge and the encrypted secret key data to the authenticator computing entity.

29. A method in accordance with claim 26, further comprising the following:

an act of the generating a digest of the secret key data combined with one or more other data items;

an act of the communicating with the authenticator computing entity using messages that are at least partially secured using the digest.

30. A computer program product for use in an environment that includes an authenticatee computing entity, a supplemental computing entity, an authenticator computing entity, and a supplemental authenticator computing entity, the computer program product for implementing a method for the authenticatee computing entity to authenticate the authenticator computing entity using challenge based authentication and without requiring the authenticatee and authenticator computing entities be aware of secret data used for the authentication, the computer program product comprising one or more computer readable storage media having thereon computer-executable instructions, that when executed by the authenticatee computing entity, causes the computing entity to perform the method, the method comprising the following:

an act of authenticatee computing entity generating secret key data that is not known to the supplemental authenticatee, authenticator or supplemental authenticator computing entities;

an act of providing the secret key data to the supplemental authenticatee computing entity thereby informing the supplemental authenticatee computing entity of the secret key data;

an act of the supplemental authenticatee computing entity encrypting the secret key data using secret data to create encrypted secret key data, the secret data known to the supplemental authenticatee and supplemental authenticator computing entities, but not known to the authenticatee and authenticator computing entities, the secret data for use in determining an answer to a challenge;

an act of the authenticatee computing entity acquiring the challenge along with the encrypted secret key data from the supplemental authenticatee computing entity;

an act of authenticatee computing entity providing the challenge along with the encrypted secret key data to the authenticator computing entity, wherein the authenticator computing entity acquires purported answer to the challenge from the supplemental authenticator computing entity by providing the encrypted secret key data to the supplemental authenticator computing entity for decryption by the supplemental authenticator computing entity, and receiving back the secret key data;

an act of the authenticatee computing entity acquiring the purported answer from the authenticator computing entity; and an act of the using the purported answer to authenticate the authenticator computing entity.

31. A computer program product in accordance with claim 30, wherein the act of acquiring a challenge from the supplemental authenticatee computing entity comprises the following:

an act of providing a challenge request to the supplemental authenticatee computing entity; and an act of acquiring proper answer to the challenge request from the supplemental authenticatee computing entity.

32. A computer program product in accordance with claim 31, wherein the act of using the proper answer to authenticate the authenticator computing entity comprises the following: an act of matching the purported with the proper answer.

33. A computer program product in accordance with claim 30, wherein the act of using the purported answer to authenticate the authenticator computing entity comprises the following:

an act of providing the purported answer to the supplemental authenticatee computing entity; and an act of receiving from the supplemental authenticatee computing entity an indication that the purported answer is a proper answer for the challenge.

34. A computer program product in accordance with claim 30, wherein the method further comprises:

an act of the supplemental authenticator computing entity decrypting the secret key data using the secret data known to the supplemental authenticatee and supplemental authenticator computing entities.

35. A computer program product in accordance with claim 34, wherein the method further comprises the following:

an act of communicating with the authenticator computing entity using messages that are at least partially secured using the secret key data.

36. A computer program product in accordance with claim 34, wherein the act of providing the challenge to the authenticator computing entity and the act of the providing the encrypted secret key data to the authenticator computing entity are performed by providing a single message that includes both the challenge and the encrypted secret key data to the authenticator computing entity.

37. A computer program product in accordance with claim 34, wherein the method further comprises the following:

an act of the generating a digest of the secret key data combined with one or more other data items;

an act of the communicating with the authenticator computing entity using messages that are at least partially secured using the digest.

* * * * *